United States Patent
Holzhauer et al.

[11] Patent Number: 5,435,808
[45] Date of Patent: Jul. 25, 1995

[54] HIDE RACEWAY TREATMENT AND IMPROVED METHOD OF CURING HIDES

[75] Inventors: Frederick W. Holzhauer; Dana J. Johnson, both of Broomfield; Terry McAninch, Westminster, all of Colo.

[73] Assignee: Birko Corporation, Henderson, Colo.

[21] Appl. No.: 169,430

[22] Filed: Dec. 17, 1993

Related U.S. Application Data

[63] Continuation-in-part of Ser. No. 116,364, Sep. 3, 1993.

[51] Int. Cl.[6] .................................................. C14C 1/02
[52] U.S. Cl. ............................... 8/94.18; 8/94.15; 252/8.57; 252/186.22; 252/186.23; 252/186.29; 210/721; 210/759; 210/705; 422/12; 424/601; 424/616
[58] Field of Search ............................ 8/94.15, 94.18; 252/8.57, 186.21, 186.22, 186.23, 186.26, 186.27, 186.28, 186.29, 186.38, 186.39, 186.41, 186.42, 186.43; 210/721, 759, 705; 422/12; 424/601, 616

[56] References Cited

U.S. PATENT DOCUMENTS

| | | | |
|---|---|---|---|
| 3,920,388 | 11/1975 | Weaver et al. | 8/94.15 |
| 4,051,058 | 9/1977 | Bowing et al. | 252/186 |
| 4,129,517 | 12/1978 | Eggensperger et al. | 252/186 |
| 4,164,393 | 8/1979 | Drury | 8/94.18 |
| 4,340,487 | 7/1982 | Lyon | 210/705 |
| 4,379,709 | 4/1983 | Margold | 8/94.15 |
| 4,457,759 | 7/1984 | Fekete et al. | 8/94.16 |
| 4,478,728 | 10/1984 | Hopkins et al. | 252/8.57 |
| 4,587,264 | 5/1986 | Jourdan-LaForte et al. | 514/557 |
| 4,960,428 | 10/1990 | Christner et al. | 8/94.18 |
| 5,149,295 | 9/1992 | Bowling et al. | 452/71 |

*Primary Examiner*—Prince Willis, Jr.
*Assistant Examiner*—Alan D. Diamond

[57] ABSTRACT

A process for the curing of animal hides using a brine solution including the step of adding an effective bactericidal and flocculating amount of a composition comprising:

10–30 wt. % acetic acid

5–20 wt. % peracetic acid

15–25 wt. % hydrogen peroxide

1–10 wt. % phosphoric acid balance water

Other peracids, such as, perlactic acid, percitric acid, perproprionic acid, perbenzoic acid, perpentenoic acid and perbutyric acid may be used.

20 Claims, No Drawings

HIDE RACEWAY TREATMENT AND IMPROVED METHOD OF CURING HIDES

This application is a continuation-in-part of application Ser. No. 08/116,364, filed on Sep. 3, 1993, relating to certain novel compositions containing peracetic acid and the method of using them in the treatment of fat containing waste water, particularly the aqueous fat containing effluent from a meat-packing plant. The present invention relates generally to the field of curing hides from a meat-packing plant prior to their shipment to another facility for tanning into leather and methods for rejuvenating a hide curing raceway. The qualities of peracetic acid, referred to in our earlier application, and others are useful in the treatment of hides in the fat containing waters of a hide-curing raceway.

BACKGROUND OF THE INVENTION

The profitability of a meat-packing plant is greatly affected by the money that the operator receives from various by-products of the meat-packing operation. Typically, the most profitable by-product is from the sale of hides for the production of leather. While the tanning operation in which the hide is turned into leather is usually conducted at another facility, it is essential for the meat-packer to preserve the value of the hide by curing the hide before shipment to the tanner. The hide must be as clean and free of bacteria as possible in order to avoid decomposition of the hide in the period between removal from the carcass and the tanning operation. That period may be as short as a few days or as long as a year or more. Decomposition occurs through the action of bacteria and enzymes, both of these processes being accelerated by heat and moisture. As used herein, references to the deleterious action of bacteria on hides generally refers to the action of both bacteria and enzymes. On a hot summer day, decomposition can begin within four hours of slaughtering and hide removal. Since uncured hides typically contain approximately two thirds water by weight, the meat-packer should insure that the cured hides are as saturated with salt as possible. This minimizes possible deterioration and reduces the chances of claims by the tanner for insufficient cure.

Perhaps the most significant goal of hide curing at the meat-packing plant is to reduce the damage that bacteria and other microorganisms can cause to the hide tissue between the time that the hide is flayed from the carcass and the time that it is tanned into leather. Typically the green hide contains contaminants that were present on the animal when it entered the meat-packing facility including fresh and decomposed manure and organic matter, such as blood, that are released from the animal during the initial stages of the slaughtering process. All of these organic materials are ideal nutrients for destructive bacteria. If the growth of bacteria is not halted by the curing process, the hide can decompose into a useless, glue-like mass prior to tanning.

The problem of inhibiting microbial growth involves a number of considerations. Obviously, the existing microbial contaminants should be killed chemically. In addition, however, it is extremely important to physically remove from the hide the organic material which is an ideal food source for microbes. As mentioned previously, the organic material includes manure, blood and other organic contaminants released in the slaughtering process as well as a not insignificant amount of fat attached to the hide itself. If both considerations are not addressed, any microbes that survive the treatment can propagate in the remaining organic material before tanning is commenced.

The problem of hide-curing has been known for many years. One of the earliest forms of hide curing was simply to dry the hide in the sun or by artificial means and to physically clean the surface. Although this method was somewhat successful in preventing decomposition of the hide, it was very difficult to re-wet the hide to produce useable leather.

At the present time, meat-packing plants in the United States typically treat green hides in a series of processing steps. Although the exact nature and order of steps may vary depending on the size and age of a plant, the larger more modern plants typically treat a hide in the following manner.

When a hide is removed from an animal, it contains manure and other dirt on one side and a layer of animal fat, that may be as thick as one-half to three-quarters of an inch, on the other. In the presence of these contaminants and with the residual body heat from the animal, bacterial decomposition of the hide will begin immediately. Accordingly, the removed hide is promptly immersed in cold water both to cool the hide and to remove at least some of the contaminants by washing.

In larger more modern plants, the cool, washed hide is processed in a fleshing machine. This device contains bars or knives which are drawn against both sides of the hide to remove excess fat on one side and manure and other physical, organic contaminants on the other. Because this equipment is relatively new and expensive, many older or smaller plants do not have a fleshing machine, and the cool, washed hide is sent immediately to a hide curing raceway.

Regardless of whether the hide has been fleshed or not, the hide sent to the raceway still contains a layer of fat and organic material, as well as bacteria. The purpose of the hide curing raceway is to physically remove the remaining fat and organic material and to chemically kill or inhibit the growth of bacteria so that the cured hide will not decompose.

A typical hide raceway is an oval shaped structure filled with brine. These structures are large, containing tens of thousands of gallons of brine and hundreds of hides. Paddle wheels placed on each side of the raceway circulate the hides in the brine to maximize contact between the hides and the brine and the removal of contaminants. The brine is a saturated aqueous solution of salt, i.e., sodium chloride. Treatment is normally affected for 16 to 72 hours, although the most typical time is about 18 hours. The salt kills the bacteria or inhibits its growth. In addition, the salt replaces a significant portion of the water in the hides. As much as a gallon or a gallon and one half of water is released from each hide. Excess brine is permitted to overflow. The operator of the curing raceway must monitor the salinity of the brine carefully to ensure that the brine remains saturated. If the brine does not remain saturated, the hides will not be saturated with salt and may decompose later.

Because of the foregoing qualities and the fact that it is relatively inexpensive, salt is the primary curing agent. Other hide preservatives and cure accelerators are sometimes added to the brine, but the principal agent is salt.

The cured hides are removed from the brine and are then treated in a wringer or by other means to reduce moisture. They are then graded, salted on the flesh side to prevent decomposition, bundled and palletized for shipment.

The brine treatment is the essential step common to hide curing processes at meat-packing plants in the United States. Although the process has been utilized since the 1950's, significant problems are now arising. Increasing environmental concerns significantly limit the disposal of the salt-containing brine. As a result, operators of meat-packing plants find it increasingly difficult to dispose of existing brine and may not have the ability to restock the raceway with fresh salt solution. This creates problems, since the buildup of organic materials, such as manure, fat and hair, and increasing concentrations of bacteria in the brine make it difficult to operate the raceway efficiently and effectively.

To solve this problem, meat-packing plants have added chlorine to the raceways to help oxidize the organic materials and to kill bacteria. This is accomplished either by adding chlorine continuously to prevent brine deterioration or by attempting to refresh the brine by adding a large dose of chlorine intermittently, for example, in a large dose prior to a weekend. Unfortunately, it has been found that certain bacteria develop an "immunity" to chlorine resulting in the increasing inability of chlorine to effectively lower the bacteria count in the brine. Moreover, while chlorine does oxidize certain of the organic materials, it does not facilitate the physical removal of organic materials, such as hair and fat, from the brine.

OBJECTS OF THE INVENTION

It is an object of the present invention to present an improved method for rejuvenating brine in hide-curing.

It is a further object of the present invention to present an improved method for curing hides.

It is an additional object of the present invention to present improved processes for rejuvenating raceway brine and curing hides that, among other things, maximize the killing of bacteria, oxidize organic compounds, assist in the physical removal of fat, hair and other solid organic materials from the brine and do not adversely corrode the raceway equipment.

These and other objects of the invention can be achieved utilizing the processes and compositions described herein.

SUMMARY OF THE INVENTION

It has now been found that the addition of a solution containing peracid to hide curing brine achieves the foregoing objects. In particular, the solution comprises:
10–30 wt. % acetic acid
5–20 wt. % peracetic acid
15–25 wt. % hydrogen peroxide
1–10 wt. % phosphoric acid
balance water These ingredients may be added in the form noted or their precursors can be mixed to generate an equivalent amount of the ingredient. For example, acetic acid and hydrogen peroxide can be contacted in the presence of an appropriate catalyst to produce peracetic acid. If the composition will be stored for any appreciable period of time, the composition should also include from 0.1–1% of a peracetic acid stabilizer. The stabilizer is typically selected from the group consisting of phosphonic acid derivatives, picolinic acid or any other sequestering agent that tightly binds trace metals.

The peracetic acid solution is added intermittently or continuously. In addition, the pH of the brine may be adjusted to between approximately 5 to 6.5. The addition of peracetic acid significantly reduces the bacteria content of the brine. If a sufficient amount of peracetic acid solution is added to the brine, fat, hair and other organic compounds can be concentrated by flocculation and physically separated and removed from the surface of the brine in the raceway. If hides are present during the rejuvenation of the brine, they are properly cured. The presence of the peracetic acid solution bleaches them, and their value is increased.

As used herein "rejuvenation" of the brine refers to the process by which the bacteria count of the brine is reduced and/or fat and other organic solids in the brine are concentrated, separated and removed from the brine.

Peracetic acid is an oxygen-containing form of acetic acid. In concentrated amounts it is explosive, and for this reason the Department of Transportation limits the concentration of peracetic acid in shipments to 42 wt. % or less. In fact, peracetic acid compositions are generally produced in solutions far less concentrated than the maximum permitted by the DOT. Because of its explosive and corrosive characteristics, it is usually manufactured as an aqueous mixture, in thermodynamic equilibrium or kinetically stabilized for its intended application, of peracetic acid, hydrogen peroxide, acetic acid, and a catalytic acid, usually but not exclusively mineral acids, the most common being sulfuric acid.

Peracetic acid has microbicidal properties and has been traditionally utilized as a hard surface cleaner. (See, e.g., U.S. Pat. Nos. 4,051,058 and 4,051,059 to Bowing et al.) When used for that purpose, peracetic acid, which attacks microorganisms quickly, may be blended with another long-term sanitizer. The other sanitizer is likely to be a quaternary ammonium chloride salt.

Although peracetic acid is known as a bactericide (i.e., germicide), it is not known as a flocculent or as a material useful in the commercial separation or purification of water, particularly the treatment of fat-containing water in a meat-packing plant. Peracetic acid has not previously been used in the curing of hides or a multipurpose agent for the rejuvenation of hide curing brine. In addition, commercially available compositions containing peracetic acid are not acceptable for waste water treatment. Among other things, these materials typically are based on sulfuric acid, which renders them deleterious to metal equipment. In addition, the solutions are generally so dilute, that large quantities would be required to effectively cure hides or rejuvenate hide curing brine.

DESCRIPTION OF THE INVENTION AND THE PREFERRED EMBODIMENT

We have now discovered an improved process for the curing of animal hides and the rejuvenate hide curing brine. This includes the addition of:
10–30 wt. % acetic acid
5–20 wt. % peracetic acid
15–25 wt. % hydrogen peroxide
1–10 wt. % phosphoric acid
balance water In addition, if the ingredients are mixed and stored in advance, they should also include 0.1–1% of a peracetic acid stabilizer selected from the group comprising phosphonic acid derivatives, picolinic acid, or any other sequestering agent that tightly binds trace metals.

The compositions of the present invention may be utilized to improve the curing of hides in several different ways. In the preferred embodiment of the invention the peracetic acid composition is added to rejuvenate the hide curing brine in the absence of any hides. As a result, the bacteria count in the brine is reduced, organic material is oxidized, and fat and other solid organic materials are flocculated, separated out and physically removed from the brine.

As noted previously, increasing environmental concerns regarding the disposal of brine have made it incumbent on the operators of meat-packing plants to reuse the hide curing brine. Over time the bacteria count in the solution rises as does the concentration of fat and other organic materials that physically clog the brine, prevent it from performing its function properly and provide a fertile source of nutrients for further bacteria growth.

In accordance with the present invention the brine solution can be rejuvenated by adding an effective bactericide and flocculating amount of peracetic acid solution. Generally, this will be in the range of approximately 100 to 600 ppm of active peracetic acid to volume of brine. The lower limit is established by the amount of peracetic acid solution which causes effective flocculation. The upper limit is primarily dictated by cost. The preferred dose is approximately 300 ppm. of active peracetic acid in the brine.

In the preferred embodiment of the invention the brine is rejuvenated in a hide curing raceway during a period of time when it is not necessary to cure hides. This may occur, for example, during or after a holiday, weekend or other plant shut down. An effective bactericide and flocculating amount of peracetic acid solution is added to the brine and mixed in the brine for approximately fifteen minutes to ensure thorough contacting and mixing. However, after this occurs, mixing is preferably terminated so as not to impair flocculation. The peracetic acid containing brine is allowed to sit over night, i.e. for approximately 8 hours, or until such time as flocculation has been sufficiently completed. At that time the surface layer comprising foam and concentrated fat, hair and other solid organic materials is separated and removed from the remaining brine. Hide curing can then be reinitiated with the existing brine and can be continued until the bacteria count of the brine or the concentration of fat and other organic solids in the brine requires rejuvenation of the brine once again.

The process of the present invention has a number of advantages:

First, the rejuvenation of the brine with peracetic acid decreases the bacteria count to as little as one tenth of the original bacteria count. While not wishing to be bound by any theory of operation, it appears that the microorganism count in solution is reduced by at least two mechanisms: (a) direct kill by denaturing of protein in live cells, and (b) indirect kill by the bleaching, flocculation and subsequent removal of organic soils that serve as nutrient for microorganisms. It should also be noted, that bacteria do not appear to develop an "immunity" to peracetic acid as they do to chlorine. Repetitive rejuvenation of the hide curing brine with the peracetic acid solution does not produce diminishing results.

Second, the flocculating effect of the peracetic acid solution assists in the removal of fat and other solid organic materials. The removal of these materials improves the contacting of the brine with the hides and reduces the growth of bacteria as noted previously.

Third, the oxidizing effect of the peracetic acid solution neutralizes some of the organic material as a nutrient for bacteria.

Finally, it should be noted that the peracetic acid solutions of the present invention are passivating agents and are not detrimental to equipment in the hide raceway. Because the ingredients of the peracetic acid solution themselves are biodegradable, they do not increase the problem of brine disposal.

In another embodiment of the invention the peracetic acid solution is added to the brine while hide curing continues. In many plants this is the only way that the process of the present invention can be conducted, since hide raceways are expensive, and typically there is little or no excess capacity. The addition of the peracetic acid can be effected gradually in low dosages in an amount that prevents deterioration of bacterial content in the brine or in larger amounts that result in significant rejuvenation of the brine in bacterial count and/or fat and other solid organic content. When used as a preventative, the minimal dose may be as small as approximately 50 ppm. of active peracetic acid or less in the brine. When used as a rejuvenating process, an effective bactericidal and flocculating amount should be in the range of approximately 100 to 600 ppm. In addition to preventing the deterioration of the brine or rejuvenating it, the addition of the peracetic acid produces a superior cured hide with reduced bacteria content and a lighter bleached color that generally brings a preferred price in the market.

Regardless of which of the foregoing processes is utilized it may be preceded or accompanied by adjustment in the pH of the brine to between approximately 5 and 6.5, preferably approximately 5.5 to 6. This is accomplished by adding an acid, such as citric, phosphoric or hydrochloric acid, to adjust the pH prior to the introduction of the peracetic acid solution. Sulfuric acid may also be used and may be preferred because of its price, although it can be deleterious to the equipment in the hide raceway. The adjustment in pH facilitates bacterial inhibition and enhances flocculation.

Preferably, the introduction of chlorine should be discontinued during the introduction of significant amounts of peracetic acid solution. Chlorine neutralizes the peracetic acid. The acids in solution also can release dangerous gases including chlorine. Although, peracetic acid can be introduced to brine which already contains a small amount of chlorine, that procedure is potentially hazardous. Following effective treatment with peracetic acid solution, chlorine may once again be added to the brine.

Modifications may be made in the compositions of the present invention without significantly affecting the process results. For example, other peracids might be used, such as perlactic acid, percitric acid, perpropionic acid, perbenzoic acid, perpentenoic acid and perbutyric acid. These acids may be substituted in whole or in part for the peracetic acid. To the extent they are so substituted, the acetic acid should also be substituted by the appropriate corresponding precursor organic acid. Thus, for example, if percitric acid is substituted for peracetic acid, the acetic acid component should be replaced by citric acid.

The novel processes of our invention are illustrated by the following examples:

EXAMPLES

Example 1

The following composition was used in curing hides and simultaneously rejuvenating brine in an operating meat-packing plant:

10 wt. % acetic acid
15–20 wt. % peracetic acid
17 wt. % hydrogen peroxide
5 wt. % phosphoric acid
0.1–1 wt. % picolinic acid
balance water The test included the addition of this composition in an amount resulting in 250 ppm active peracetic acid in an operating raceway with a full complement of freshly loaded fleshed hides. The peracetic acid solution was added on a Friday evening, and the raceway was operated throughout the weekend in accordance with normal procedure. Samples of brine taken before the test was started on Friday evening and again on Monday revealed the following.

| BRINE | (FRIDAY - BEFORE) | (MONDAY - AFTER) SAMPLE 1 | SAMPLE 2 |
|---|---|---|---|
| pH | 6.9 | 6.5 | 6.6 |
| SALOMETER (% saturation) | 97 | 98 | 98 |
| PROTEOLYTIC BACTERIA (per ml.) | 54,000 | 1,000 | 3,400 |
| TOTAL BACTERIA (per ml.) | 1,620,000 | 30,000 | 60,000 |
| ORGANIC (% by wt.) | 0.91 | 0.87 | — |
| SALT (% by wt.) | 25.78 | 26.13 | — |
| TRUE SALOMETER (% saturation) | 97.66 | 98.99 | — |

These results indicate a bacteria kill of greater than 90 percent.

Hides were also tested for moisture content and salt uptake and their appearance was noted. The cure results were excellent with the hides being of superior quality in cleanliness and color.

Example 2

The peracetic acid composition of Example 1 was also applied in three equivalent raceways in a meat-packing plant. The condition of the brine was much worse than in Example 1. A typical sample of brine taken prior to introduction of peracetic acid had the following analysis.

| pH | 6.8 | |
|---|---|---|
| Lab Salometer | 92% | saturation |
| True Salometer | 90.6% | saturation |
| Proteolytic bacteria | 140,000 | per ml. |
| Total Bacteria | 2,950,000 | per ml. |
| Organic Content | 1.72 | wt. % |
| Salt | 23.92 | wt. % |

On Wednesday, chlorination of the raceway which was conducted continuously at a low dosage at this plant, was discontinued. On Thursday, at 3:00 p.m. the peracetic acid was added to result in 120 ppm active peracetic acid to each raceway after the pH had been adjusted to 6 with sulfuric acid. One raceway had 500 hides, another 300 hides and the third had no hides. In this instance the hides were unfleshed, carrying a layer of fat.

Each raceway was sampled prior to pH adjustment and after running throughout a weekend. In the case of the raceway without hides, the peracetic acid solution was mixed for 15 minutes and then allowed to stand. The total bacteria counts were as follows:

| Raceway | Before Peracetic Acid | After |
|---|---|---|
| No hides | 10.5 Million per ml. | 1.6–2 Million per ml. |
| 300 hides | 7.5 Million per ml. | 2.3–4.5 Million per ml. |
| 500 hides | 6.1 Million per ml. | 3.05 Million per ml. |

The total bacteria counts showed significant reduction after the addition of peracetic acid solution. The tank which did not have hides had the greatest reduction of total bacteria and organic matter. In addition, the peracetic acid solution reduced the odor of the brine. The samples taken after peracetic acid treatment were sweeter smelling than the previous samples had been. Also, the brine was not as red, suggesting that some blood was oxidized by the bleaching effect of the peracetic acid solution.

The description and examples set forth herein are intended to illustrate representative embodiments of the invention. The claims which follow are not intended to be limited to the specific disclosed embodiments. The invention is susceptible to modification, variation and change without departing from the proper scope or fair meaning of the following claims.

We claim:

1. In a process for the curing of animal hides including the step of contacting the hides with brine, the improvement comprising:
   adding to the brine an effective bactericidal amount of a composition comprising:
   10–30 wt. % acetic acid
   5–20 wt. % peracetic acid
   15–25 wt. % hydrogen peroxide
   1–10 wt. % phosphoric acid
   balance water.

2. The process of claim 1 in which the composition also comprises 0.1–1 wt. % of a peracetic acid stabilizer comprising a sequestering agent that tightly binds trace metals.

3. The process of claim 2 in which said composition is added to the brine in an amount constituting approximately 50 to 600 ppm active peracetic acid in the brine.

4. The process of claim 2 in which the pH of the brine is adjusted to between 5.0 and 6.5 prior to adding said composition to the brine.

5. The process of claim 2 in which the peracetic acid stabilizer is at least one member selected from the group consisting of phosphonic acid derivatives and picolinic acid.

6. The process of claim 1 in which the composition comprises:
   10 wt. % acetic acid
   15–20 wt. % peracetic acid
   17 wt. % hydrogen peroxide
   5 wt. % phosphoric acid
   0.1–1 wt. % picolinic acid
   balance water.

7. The process of claim 6 in which said composition is added to the brine in an amount constituting approximately 50 to 600 ppm active peracetic acid in the brine.

8. The process of claim 6 in which the pH of the brine is adjusted to between 5.0 and 6.5 prior to adding said composition to the brine.

9. A process for rejuvenation of a brine solution utilized in curing animal hides, said brine solution containing solid organic material, comprising:
adding an effective bactericidal and flocculating amount of a composition comprising:
10-30 wt. % acetic acid
5-20 wt. % peracetic acid
15-25 wt. % hydrogen peroxide
1-10 wt. % phosphoric acid
balance water
and subsequently removing a layer comprising concentrated solid organic materials.

10. The process of claim 9 in which the composition also comprises 0.1-1 wt. % of a peracetic acid stabilizer comprising a sequestering agent that tightly binds trace metals.

11. The process of claim 10 in which said composition is added to the brine in an amount constituting approximately 100 to 600 ppm active peracetic acid in the brine.

12. The process of claim 10 in which the pH of the brine is adjusted to between 5.0 and 6.5 prior to adding said composition to the brine.

13. The process of claim 10 in which the peracetic acid stabilizer is at least one member selected from the group consisting of phosphonic acid derivatives and picolinic acid.

14. The process of claim 9 in which the composition comprises:
10 wt. % acetic acid
15-20 wt. % peracetic acid
17 wt. % hydrogen peroxide
5 wt. % phosphoric acid
0.1-1 wt. % picolinic acid
balance water.

15. The process of claim 14 in which said composition is added to the brine in an amount constituting approximately 100 to 600 ppm active peracetic acid in the brine.

16. The process of claim 14 in which the pH of the brine is adjusted to between 5.0 and 6.5 prior to adding said composition to the brine.

17. In a process for the curing of animal hides including the step of contacting the hides with brine, the improvement comprising:
adding to the brine an effective bactericidal amount of a composition comprising:
5-20 wt. % of at least one peracid
10-30 wt. % of the corresponding acid precursor of said peracid
15-25 wt. % hydrogen peroxide
1-10 wt. % phosphoric acid
0.1-1 wt. % peracid stabilizer
balance water.

18. The process of claim 17 in which said peracid is selected from the group consisting of peracetic acid, perlactic acid, percitric acid, perpropionic acid, perbenzoic acid, perpentenoic acid and perbutyric acid and the acid precursor is selected from the group consisting of acetic acid, lactic acid, citric acid, propionic acid, benzoic acid, pentenoic acid and butyric acid corresponding to the peracid.

19. A process for rejuvenation of a brine solution utilized in curing animal hides, said brine solution containing solid organic material, comprising:
adding an effective bactericidal and flocculating amount of a composition comprising:
10-30 wt. % of at least one peracid
5-20 wt. % of the corresponding acid precursor of said peracid
15-25 wt. % hydrogen peroxide
1-10 wt. % phosphoric acid
0.1-1 wt. % peracid stabilizer
balance water
and subsequently removing a layer comprising concentrated solid organic materials.

20. The process of claim 19 in which said peracid is selected from the group consisting of peracetic acid, perlactic acid, percitric acid, perpropionic acid, perbenzoic acid, perpentenoic acid and perbutyric acid and the acid precursor is selected from the group consisting of acetic acid, lactic acid, citric acid, propionic acid, benzoic acid, pentenoic acid and butyric acid corresponding to the peracid.

* * * * *